United States Patent
Teutsch et al.

(10) Patent No.: US 6,563,284 B2
(45) Date of Patent: May 13, 2003

(54) SINGLE WIRE DIGITAL WIDTH MODULATION FOR FAN CONTROL WITH TACHOMETER FEEDBACK

(75) Inventors: Alexander Noam Teutsch, Dallas, TX (US); Zbigniew Jan Lata, Dallas, TX (US); David John Baldwin, Allen, TX (US); Ross E. Teggatz, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 34 days.

(21) Appl. No.: 09/989,065

(22) Filed: Nov. 21, 2001

(65) Prior Publication Data

US 2002/0060544 A1 May 23, 2002

Related U.S. Application Data

(60) Provisional application No. 60/252,304, filed on Nov. 21, 2000.

(51) Int. Cl.[7] .............................................. G05B 11/28
(52) U.S. Cl. ...................... 318/599; 318/716; 318/798; 318/811
(58) Field of Search ................................ 318/439, 716, 318/599, 798, 811

(56) References Cited

U.S. PATENT DOCUMENTS

6,392,418 B1 * 5/2002 Mir et al. ...................... 241/69

* cited by examiner

Primary Examiner—Karen Masih
(74) Attorney, Agent, or Firm—J. Dennis Moore; W. James Brady, III; Frederick J. Telecky, Jr.

(57) ABSTRACT

The present invention relates to a motor drive system which comprises a fan controller circuit operable to generate a PWM control signal for control of a motor speed. The fan controller circuit comprises a current detection circuit and a motor speed determination circuit. The system further comprises a fan driver circuit operable to drive a motor at a duty cycle based on the PWM control signal from the fan controller circuit. The fan driver circuit comprises a current sink circuit operable to draw current from the PWM control signal when the PWM control signal is high and when the motor reaches a predetermined position. In the addition, the current detection circuit is operable to detect the current draw on the PWM control signal and provide an indication signal to the fan speed determination circuit associated with such detection. Further, the motor speed determination circuit is operable to determine the speed of the motor based upon a timing associated with successive current draw detections. The present invention also relates to a method of determining a motor speed which comprises driving a motor at a duty cycle dictated by a PWM control signal and detecting a predetermined rotor position of the motor. The method further comprises generating a current pulse based on the rotor position, wherein the current pulse is convolved with the PWM control signal, detecting the current pulse, and determining the motor speed using successive detected current pulses.

26 Claims, 3 Drawing Sheets

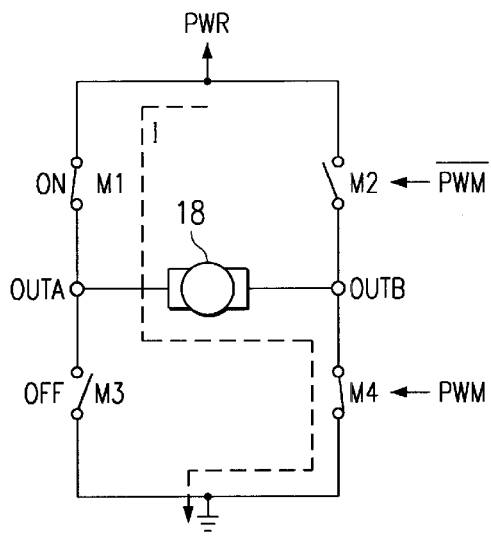
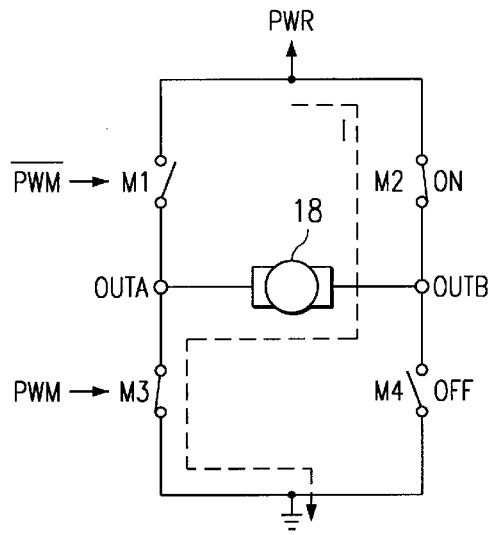
FIG. 3b
FIG. 3c
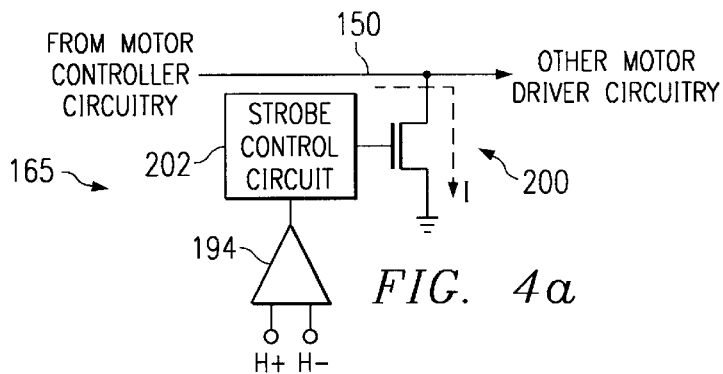
FIG. 4a
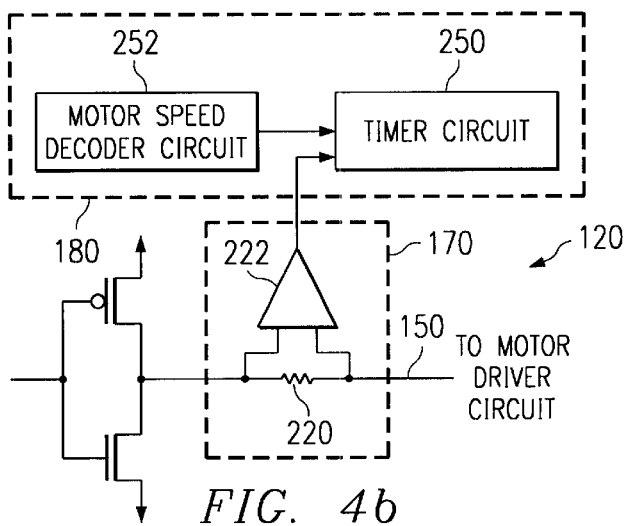
FIG. 4b
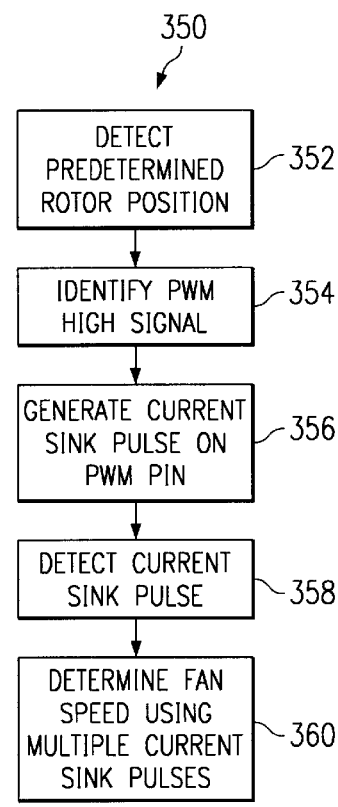
FIG. 6

SINGLE WIRE DIGITAL WIDTH MODULATION FOR FAN CONTROL WITH TACHOMETER FEEDBACK

This application claims priority under 35 USC §119(e)(1) of provisional application Ser. No. 60/252,304, filed Nov. 21, 2000.

FIELD OF THE INVENTION

The present invention relates to electronic circuits and, more particularly, to a circuit, system, structure and method for controlling and monitoring the speed of a motor.

BACKGROUND OF THE INVENTION

Electronic circuits are employed in numerous consumer and industrial applications. Such applications are extremely diverse; from computers, to wireless portable communications devices, to industrial controls, etc. In such myriad applications, the electronic circuits, typically fabricated and packaged as integrated circuit (IC) chips, are utilized to achieve various types of functions, for example, digital control, digital-to-analog (D/A) or analog-to-digital (A/D) conversion, mixed signal analysis, etc.

One exemplary circuit application relates to the drive and control of DC cooling fans which are employed in systems such as portable, notebook computers. Such cooling fans operate to cool the various notebook computer components located therein and are controlled using, for example, a DC brushless motor. The DC brushless motor, in turn, is driven and controlled by a control system, as illustrated in prior art FIG. 1, and designated at reference numeral 10.

The exemplary system 10 includes a fan speed controller circuit 12 and a fan driver circuit 14. The fan speed controller circuit 12 provides a control signal, for example, a pulse width modulation (PWM) signal to the fan driver circuit 14 based on a desired fan speed. The system 10 further may include a motor position detection circuit 16 such as a Hall sensor which monitors the relative rotor/stator position of the DC brushless motor 18 and provides motor position information back to the fan driver circuit 14 for commutation control thereof.

The system 10 of prior art FIG. 1 is powered by a system power supply 20, for example a 5 V DC battery. In such systems where circuits such as the fan driver circuit 14 interface with the power supply 20, protection mechanisms such as an external blocking diode 22 may be employed to prevent a reverse bias system condition from causing a reverse current to flow through the fan driver circuit 14 back to the power supply 20.

When providing fan speed control in the system 10 of prior art FIG. 1, prior art solutions often employed two wires between the fan controller circuit 12 and the fan driver circuit 14, respectively. The multiple wires therebetween were used to pass various portions of required data between the fan controller circuit 12 and the fan driver circuit 14, which are typically separate integrated circuit chips (ICs). Using extras wires has several disadvantages since it requires extra IC pins and internal pads associated with the chips. A second prior art solution used an analog feedback methodology. The analog solution, however, requires analog circuitry which may be not be available or suitable in many cases. Lastly, another prior art speed control solution utilized a single wire serial interface, wherein multiple pieces of data of serially multiplexed along the single wire. Such a solution, however, disadvantageously requires an excessive amount of logic overhead to manage and control such data and impacts a driving efficiency of the motor.

There is a need in the art for improvements in fan speed control circuits and systems which overcome the disadvantages associated with the prior art.

SUMMARY OF THE INVENTION

The present invention relates to a system and method of controlling the speed of a motor in a variety of applications, for example, fan speed control in portable electronics systems. In particular, the present invention relates to a system and method of generally concurrently controlling and monitoring a motor speed over a single wire via a convolution of motor speed information in a pulse width modulation (PWM) control signal which serves as a speed control signal.

According to one aspect of the present invention, a motor driver system is disclosed in which motor speed control information and actual motor speed information is conveyed over a single wire between system components. The motor driver system comprises a motor controller circuit which is operable to generate a PWM control signal which dictates a duty cycle (and a target speed) at which the motor is to be driven. The system further comprises a motor driver circuit which drives the motor as dictated by the PWM control signal and the desired commutation scheme.

The motor driver circuit is operable to utilize motor position information to draw current associated with the PWM control signal, thereby convolving the motor speed control information with motor speed information over a single wire between the two circuits, respectively, which carries the PWM control signal. Detection circuitry associated with the motor controller circuit detects the current draw associated with the PWM control signal and uses successive detected current draws to determine the actual motor speed. The determined motor speed may then be used to modify the PWM control signal (e.g., vary the duty cycle) to maintain a desired or target motor speed or motor speed range, as may be desired.

According to another aspect of the present invention, a motor driver system having tachometer feedback is disclosed. The motor driver system comprises a motor controller circuit which is operable to generate a PWM control signal which dictates a duty cycle and thus a desired speed at which the motor is to be driven. The system further comprises a motor driver circuit which is operable to drive the motor at a duty cycle associated with the PWM control signal. The motor driver circuit comprises a motor position detection circuit and a current pulse generation circuit. The motor position detection circuit is operable to generate a signal or other type indication which is associated with a predetermined motor rotor position and the current pulse generation circuit is operable to generate a current event such as a current pulse which is convolved with the PWM control signal in response to the rotor position detection signal or indication. The motor controller circuit further comprises a motor speed determination circuit which is operable to utilize the generated current pulses associated with the predetermined motor rotor position to determine the motor speed.

According to still another aspect of the present invention, the current pulse generation circuit comprises a transistor, for example, an NMOS transistor, having a terminal such as a drain coupled to the PWM control signal. The transistor further comprises a control terminal, for example, a gate, which is coupled to the motor position detection circuit. The transistor then conducts for a predetermined time period when the motor position detection circuit provides an indication that the predetermined rotor position has been detected, thereby generating current draw for a predetermined time period which is convolved on the PWM control signal.

According to yet another aspect of the present invention, the motor speed determination circuit comprises a timer circuit which is operable to generate data which indicates a time period between successive current pulses on the PWM control line. The motor speed determination circuit further comprises a decoder circuit which is operable to determine a motor speed based on the data generated by the timer circuit and, alternatively, with information relating to a type of motor being employed in the system. In addition, the motor speed determination circuit may comprise a current pulse detection circuit having a resistive component and a comparator circuit associated therewith, wherein the comparator trips when a voltage across the resistive component exceeds a predetermined threshold, thereby indicating the existence of a current pulse conducting therethrough. The timer circuit may then ascertain a time period between successive comparator trip points at its output.

According to another aspect of the present invention, the motor position detection circuit comprises a Hall sensor which is operable to detect a magnetic flux which varies as a function of rotor position, and output a signal, for example, a differential signal, associated therewith. The motor position detection circuit further comprises a predetermined position detection circuit which takes the Hall sensor output signal and generates a digital signal having a transition frequency which is a function of a predetermined rotor position. For example, the predetermined position detection circuit may comprise a comparator circuit which is operable to trip at a time related to a zero crossing of a differential signal associated with the Hall sensor. The digital signal is then employed to generate current pulses which are convolved with the PWM control signal, wherein the current pulses are associated with a frequency at which the predetermined motor position is detected.

According to still another aspect of the present invention, a method of determining and controlling a motor speed is disclosed. The method comprises driving a motor using a duty cycle which is a function of a PWM control signal. For example, a motor speed controller circuit may output the PWM control signal to a motor drive circuit which employs the PWM control signal to drive the motor using a duty cycle associated with the PWM control signal. The method further comprises detecting a predetermined motor position, for example, by identifying when a rotor of the motor crosses a pole. A current event such as a current pulse is then generated based on the detected motor position and the current event is convolved with the PWM control signal, thereby allowing motor speed information to be conveyed across the same wire which contains the motor speed control information. The method further comprises detecting the generated current event and successive detected current events are employed to ascertain the actual motor speed. Once determined, the motor speed data may be employed to modify the PWM control signal in order to achieve or maintain a desired motor speed target or range.

According to yet another aspect of the present invention, a current pulse is generated and convolved with the PWM control signal by coupling the PWM control signal to a current sink circuit which is activated by the detection of the predetermined motor position. For example, when a rotor of the motor crosses a motor pole, a signal is generated which causes the current sink circuit, for example, an NMOS transistor, to activate and sink current when the PWM control signal is high. Therefore the wire which transmits the PWM control signal contains motor speed control data as dictated by the PWM control signal and actual motor speed data as evidenced by the current pulses convolved therewith.

According to another aspect of the present invention, the current pulses convolved with the PWM control signal are detected by passing the PWM control signal through a resistive component such as a resistor. When a current draw occurs on the PWM control signal, a voltage across the resistive component is detected, for example, using a comparator circuit which trips when a voltage at its inputs exceeds a threshold value. The detected current, for example, the switching of the comparator circuit is then noted using, for example, a timer circuit. By noting the time period between successive current pulses using the timer circuit, a decoder circuit may be employed to ascertain the actual motor speed. For example, a plurality of timer periods between successive current pulses may be accumulated and averaged to identify an average motor speed and/or data associated with the type of motor (e.g., single pole, double pole) may be utilized in determining the motor speed. With the actual motor speed determined, such information may be employed by a motor speed controller circuit as compensation data in varying the PWM control signal to achieve a desired motor speed value or range, as may be desired.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed and the present invention is intended to include all such embodiments and their equivalents. Other objects, advantages and novel features of the invention will become apparent from the following detailed description of the invention when considered in conjunction with the drawings.

BRIEF DESCRIPTION OF THE DRAWINGS

FIG. 3b is a schematic diagram illustrating an H-bridge circuit illustrating an exemplary drive scheme in which a motor is driven in a first direction;

FIG. 3c is a schematic diagram illustrating an H-bridge circuit illustrating an exemplary drive scheme in which a motor is driven in an opposite direction;

FIG. 4a is a combined block diagram and schematic diagram illustrating a current detection circuit and a motor speed determination circuit according to an exemplary aspect of the present invention;

FIG. 4b is a combined block diagram and schematic diagram illustrating a current sink circuit according to an exemplary aspect of the present invention;

FIG. 6 is a flow chart diagram illustrating a method of determining and controlling a motor speed using single wire tachometer feedback according to another exemplary aspect of the present invention.

DETAILED DESCRIPTION OF THE INVENTION

The present invention will now be described with respect to the accompanying drawings in which like numbered elements represent like parts.

The present invention relates to a system and method of controlling a motor speed by convolving motor speed control information and actual motor speed information on a single wire. Accordingly, many of the disadvantages associated with prior art solutions are overcome. For example, a motor controller circuit generates a PWM control signal to a motor driver circuit over a single wire, and the motor driver circuit drives the motor at a speed which is a function of a duty cycle dictated by the PWM control signal. A predetermined motor position is detected, for example, a rotor crossing a motor pole, and the position detection is used to generate a current draw, for example, a current pulse, on the single wire containing the PWM control signal when the PWM control signal is high. In the above manner, motor speed data represented by the current events is convolved with motor speed control data represented by the PWM control signal over a single wire between the motor controller circuitry and the motor driver circuitry, respectively.

The current events or draws, for example, current pulses, on the PWM control signal line are then detected and a time period between successive current events is used to ascertain a rate at which the motor is rotating. For example, the PWM control signal is passed through a resistive component and when a current draw or pulse occurs on the PWM control signal line, a voltage appears across the resistive component. The voltage is detected using, for example, a comparator circuit, and by ascertaining a time period between successive current events, the motor speed may be determined readily. Using the determined motor speed as feedback or compensation type information, the motor controller circuitry may modify the PWM control signal (e.g., alter the duty cycle) in response thereto in order to achieve a desired motor speed target or range, as may be desired.

Figure 1:
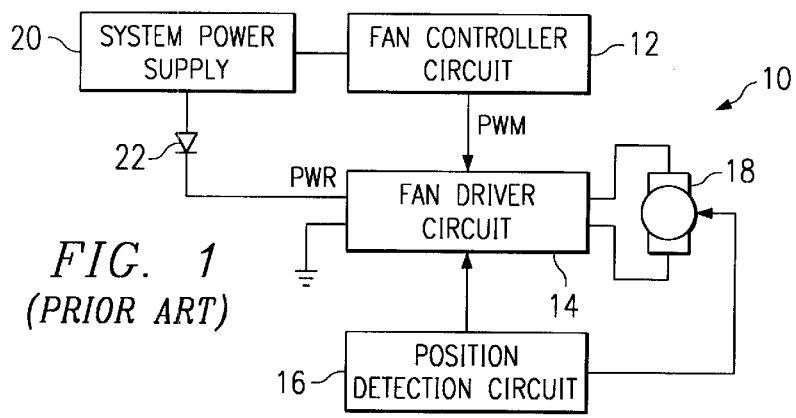
FIG. 1 is a system level block diagram illustrating a prior art fan control system.
Figure 2:
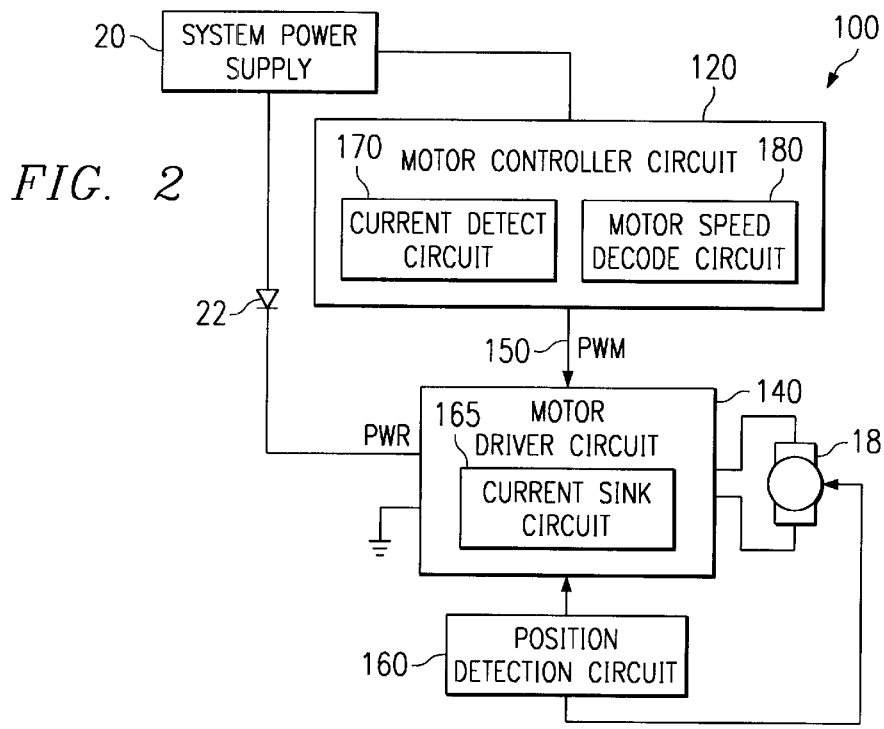
FIG. 2 is a system level block diagram illustrating a motor control system employing a single wire tachometer feedback system according to one exemplary aspect of the present invention.

Turning now to the figures, FIG. 2 is a block level system diagram illustrating a motor drive system in accordance with an exemplary aspect of the present invention, and is designated at reference numeral 100. System 100 may include a power supply 20 and a blocking diode 22 as in prior art type systems, however, system 100 differs from prior art systems such as that illustrated in prior art FIG. 1 due to a motor controller circuit 120 and a motor driver circuit 140, respectively. According to one aspect of the present invention, the motor controller circuit 120 and the motor driver circuit 140 cooperatively operate to drive the motor 18 at a desired speed target or range by convolving motor speed control data and actual motor speed data on a single wire 150 which may be called a PWM control signal line.

According to one exemplary aspect of the present invention, the motor driver circuit 140 drives the motor at a speed which is a function of a duty cycle of the PWM control signal on wire 150. The motor driver circuit 140 then drives the motor 18 based on a state of the motor 18 (e.g., as may be indicated by a motor position detection circuit 160) and a commutation scheme which is a function of the type of motor being employed in the system, as will be described in greater detail below. In addition, the motor driver circuit 140 is operable to take predetermined motor position information provided by the motor position detection circuit 160 and generate a current event or draw such as a current pulse associated therewith. Further, the motor driver circuit 140 convolves the generated current event on the line 150 containing the PWM control signal when the PWM control signal is high. In the above manner, the wire 150 contains both motor speed control data (e.g., the PWM control signal) and actual motor speed data (e.g., the current events) which are convolved together.

According to one exemplary aspect of the present invention, the motor driver circuit 140 comprises a current sink circuit 165 which is operable to draw current from the control line 150 when the PWM control signal is high based on a predetermined motor position detection by the motor position detection circuit 160. For example, if the motor position detection circuit 160 is operable to generate a signal or other type indication each time the rotor of the motor crosses a motor pole, then a frequency of the detection circuit signal is related to a speed at which the motor 18 is rotating. The current sink circuit 165 is operable to use the detection circuit signal to generate a current draw such as a current pulse on the control line 150 when the PWM control signal is high. The frequency at which the current draws (e.g., pulses) occur thus correspond to a speed of the motor 18 and in the above exemplary manner the motor speed data is convolved with the motor speed control data on the single wire control line 150.

The motor controller circuit 120 of FIG. 2 is operable to detect the current events convolved with the PWM control signal on the single wire 150 and use such current information to ascertain an actual motor speed and use the motor speed data as feedback or compensation information to alter the PWM control signal in order to maintain or achieve a desired motor speed target or range. To that end, the motor controller circuit 120 comprises a current detection circuit 170 and a motor speed determination circuit 180, respectively. According to one exemplary aspect of the present invention, the current detection circuit 170 is operable to detect the current events such as current pulses on the line 150 and give an indication of such detection to the motor speed determination circuit 180. The motor speed determination circuit 180 then uses the indication of successive detected current events to determine the actual speed of the motor 18.

Figure 3A:
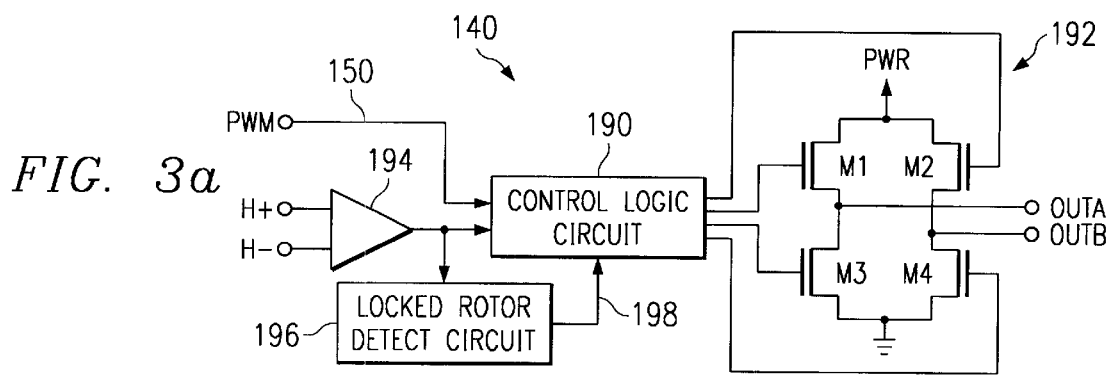
FIG. 3a is a combined block diagram and schematic diagram illustrating an exemplary motor driver circuit architecture according to one exemplary aspect of the present invention.

To more fully understand at least one exemplary manner in which the present invention may operate, an exemplary portion of the motor driver circuit 140 is illustrated in FIG. 3a. The motor driver circuit 140 comprises a control logic circuit 190 and an H-bridge motor drive circuit 192 coupled thereto. The control logic circuit 190 is operable to generate one or more logic control signals to the H-bridge circuit 192 based on a variety of system conditions. For example, for a bipolar-wound single phase brushless motor at the H-bridge outputs OUTA and OUTB, the H-bridge circuit 192 may occupy drive states such that the stator winding current of the motor 18 is driven from OUTA to OUTB or from OUTB to OUTA, respectively, based on the commutation drive scheme. The motor winding is pulse width modulated from the low side, and may also incorporate an inductive current re-circulation option on the high side during turn-off.

Exemplary bi-directional H-bridge drive schemes are illustrated in FIGS. 3b and 3c, respectively. In FIG. 3b, the motor 18 is driven with a stator winding current in the direction of OUTA to OUTB. In such an instance, the control logic circuit 190 provides control signals to the various transistors M1, M2, M3 and M4, respectively, such that M1 is on, M3 is off, and M2 and M4 are switched on and off in an alternating manner as dictated by the PWM control signal. Therefore when PWM is high, the current (I) travels through M1, the motor 18 and M4 to circuit ground; while when PWM is low, current re-circulates from M1 to motor 18, and through M2 back to M1 in a mode sometimes referred to as synchronous rectification. As can be seen from FIG. 3b, a speed of the motor 18 is a function of the duty cycle of the PWM control signal.

In the opposite direction, the control logic circuit 190 drives the H-bridge circuit 192 in a manner similar to that shown in FIG. 3c. In FIG. 3c, the stator winding current is in the direction from OUTB to OUTA, and M2 is on, M4 is off, and M1 and M3 are switching on and off in an alternating manner based on the PWM control signal. Thus when PWM is high, current conducts through M2, the motor 18 and M3 to circuit ground; and when PWM is low, the current re-circulates from M2 through motor 18 and M1 back to M2 in the synchronous rectification mode.

The control logic circuit 190 provides such switching from OUTA to OUTB and vice-versa, as illustrated in FIGS. 3b and 3c, based on certain conditions, for example, a motor position. For example, the control logic circuit 190 may switch the direction of the motor based on information from the motor position detection circuit 160 of FIG. 2. In accordance with one exemplary aspect of the present invention, the motor position detection circuit 160 may comprise a Hall sensor which is operable to detect a magnetic flux which is a function of an angular position of the rotor of the motor 18. The Hall sensor is operable to generate a differential signal (H+–H−) which reflects the varying magnetic flux as the rotor rotates during motor operation. As illustrated in FIG. 3a, the differential signal (H+–H−) may be input to a comparator circuit 194 such that the comparator circuit 194 trips based on a state of the differential signal and thus based on a predetermined position of the rotor of the motor 18.

In accordance with one exemplary aspect of the present invention, the output of the comparator circuit 194 of FIG. 3a is employed by the control logic circuit 190 to control the commutation scheme of the motor 18 so that the direction in which the motor 18 is driven is controlled to optimize motor efficiency. In addition, the output of the comparator circuit 194 may also be utilized to identify a potential locked rotor condition, for example, in conjunction with a locked rotor detection circuit 196, as illustrated in FIG. 3a. For example, if the output of the comparator 194 does not switch in a somewhat regular manner, then one conclusion may be that the magnetic flux detected by the Hall sensor is no longer varying which would occur if the rotor were locked. To mitigate the impact of this condition, the locked rotor detection circuit 196 evaluates a timing of the comparator circuit 194 and if the comparator output does not change within a predetermined period of time (e.g., about 1 second), then the locked rotor detection circuit 196 outputs a disable signal 198 to the control logic circuit 190 to effectuate a disabling of the transistors M1–M4 for a predetermined period of time (e.g., about 8 seconds).

Turning now to FIG. 4a, an exemplary current sink circuit 165 of the motor driver circuit 140 of FIG. 2 is illustrated. The exemplary current sink circuit 165 comprises a transistor 200, for example, an NMOS transistor, having a control terminal such as the gate coupled to a strobe control circuit 202. The strobe control circuit 202 receives the output of the comparator 194 of FIG. 3a which, when tripped, indicates a detection of a predetermined position of the motor 18 (e.g., detection of a motor pole crossing). In response thereto, the strobe control circuit 202 generates a control signal at the gate of the transistor 200 in order to activate the transistor 200.

The strobe control circuit 202 controls a timing of the control signal so that the transistor 200 is activated at a particular time or within a particular time range. For example, if the PWM control signal on line 150 is oscillating at a frequency of about 18 KHz, the strobe circuit 202 may look for the next rising edge of the PWM control signal and generate its control signal with a timing such that the transistor 200 conducts for about 1 microsecond at a time period of about 1 microsecond after the detected rising edge of PWM to thus ensure that the transistor activation occurs when the PWM control signal is at a high digital value.

When the transistor 200 is activated by the strobe control circuit 202 when the PWM control signal is high, current conducts through the transistor 200 for a predetermined period of time as dictated by the timing of the control signal from the strobe control circuit 202 (e.g., about 1 microsecond). The conduction of the transistor 200 causes current draw (I) on the PWM control line. Since the timing of the current event (e.g., a current pulse) corresponds to a predetermined position of the rotor, then successive current events on the PWM control line correspond to data which reflects a speed of the motor 18. In the above exemplary manner, both motor speed control data (e.g., PWM) and actual motor speed data (e.g., successive current events) are convolved on the single wire control line 150.

Turning now to FIG. 4b, an exemplary current detection circuit 170 and a motor speed determination circuit 180 (which make up a portion of the motor controller circuit 120 of FIG. 2) is illustrated. The exemplary current detection circuit 170 comprises a resistive component 220 (e.g., a resistor) having inputs of a comparator circuit 222 coupled thereacross. As discussed briefly above, when a current event occurs on the PWM control signal due to the current sink circuit 165 (see, e.g., FIG. 2 and FIG. 4a), current conducts on the control line 150 through the resistive component 220 which causes a voltage to develop thereacross. When the voltage at the input of the comparator circuit 222 exceeds a predetermined threshold of the appropriate polarity (e.g., to avoid spurious noise or other effects from inadvertently tripping the comparator 222), the comparator circuit 222 trips and its output transitions from one state to another (e.g., going from a low digital value to a high digital value).

The output of the comparator circuit 222 is coupled to the motor speed determination circuit 180, as illustrated in FIG. 4b. According to one exemplary aspect of the present invention, the motor speed determination circuit 180 comprises a timer circuit 250 coupled to the comparator circuit 222 of the current detect circuit 170 as illustrated. The timer circuit 250 is operable to determine a time period between successive detected current events on the PWM control signal. For example, the timer circuit 250 may comprise a counter which increments its count at a rate dictated by an oscillator having a known frequency. Alternatively, other timer circuit configurations may be employed and any type of circuit which is operable to ascertain a time period between successive current events such as current pulses as indicated by the comparator circuit 222 may be employed and is contemplated as falling within the scope of the present invention.

According to one exemplary embodiment of the present invention, the timer circuit 250 is operable to evaluate a plurality of successive current events and determine an average time period therebetween, however, a single set of successive current events may be used, as may be desired. In addition, the timer circuit 250 may include various types of signal processing or statistical processing circuitry in order to process the data from the comparator circuit 222, as may be desired.

Once the time period associated with successive current events has been ascertained by the timer circuit 250, a motor speed decoder circuit 252 uses the time period data to determine the actual motor speed. For example, if the timer data indicates that the average time period between successive current events on the PWM control signal is about 12 milliseconds, and it is known that due to the type of motor 18 being used in the system, that a current event occurs for each complete revolution of the rotor, then the decoder circuit 252 can determine that the motor speed is about 5000 RPMs (i.e., 12 milliseconds/revolution=0.083 revolutions/millisecond, and with 60,000 milliseconds in a minute, the motor speed in RPMs is 0.083 revolutions/millisecond×60,000 milliseconds/minute=5000 RPMs). As can be seen from the above example, the determination made by the decoder circuit 252 is a function of the type of motor be employed in the system. That is, some motors may have multiple poles such that if the current events occur each time a pole is detected, then such a factor is incorporated into the calculation. It is contemplated that the decoder circuit 252 may be configured for a specified type of motor, or alternatively may be a universal type of decoder which is programmable based on data identifying the type of motor being utilized in the system.

Figure 5:
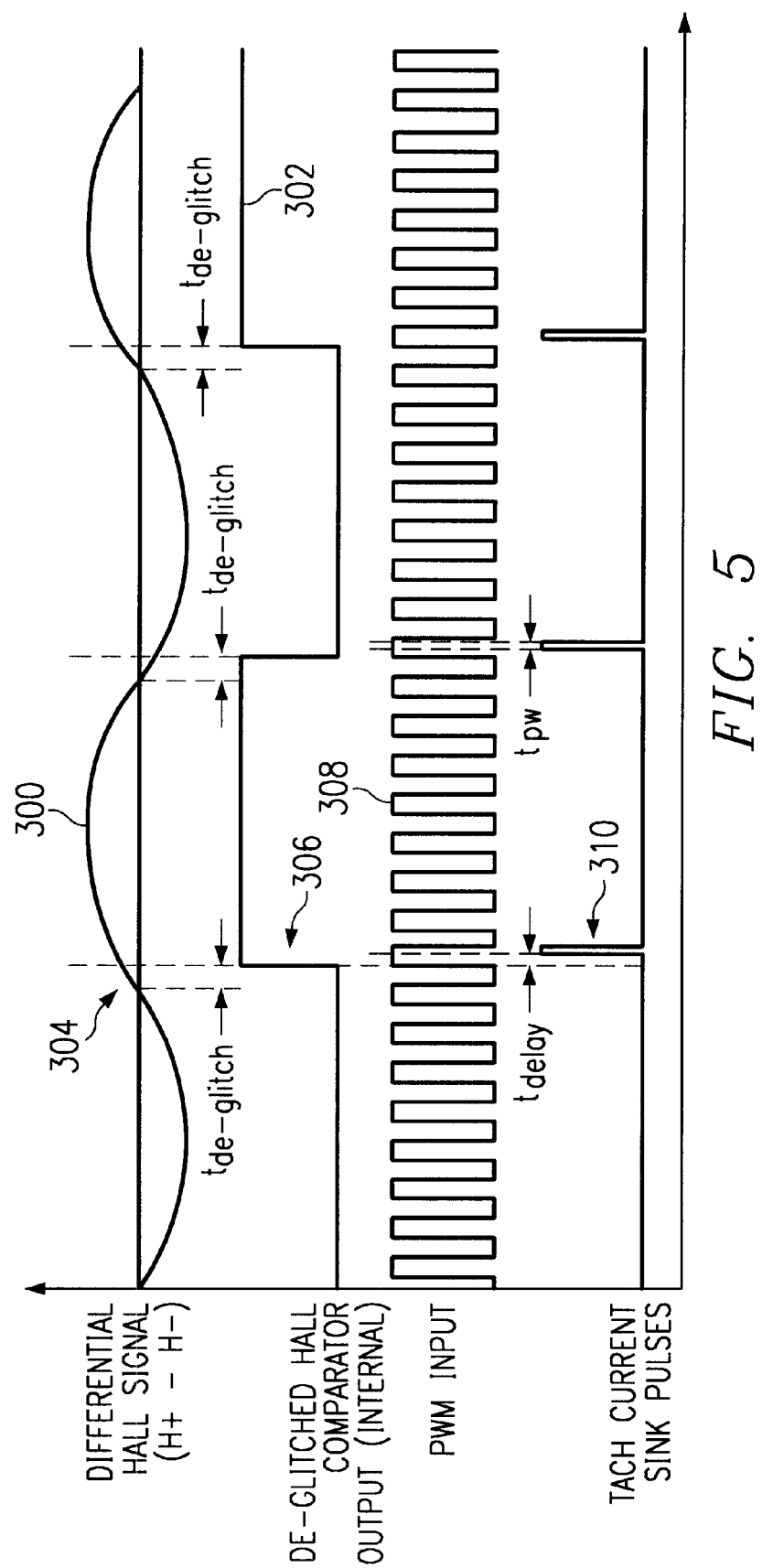
FIG. 5 is a timing diagram illustrating a plurality of exemplary waveforms and highlighting an exemplary operation of various circuits according to an aspect of the present invention.

To more fully understand the operation of the present invention, according to one exemplary aspect, a timing diagram of several exemplary signals is illustrated in FIG. 5. As described above, in conjunction with FIG. 4a, for example, a Hall sensor is operable to detect a magnetic flux associated with the motor 18, wherein the magnetic flux is a function of a position of the rotor. In turn, the Hall sensor generates a differential signal (e.g., H+–H–) corresponding to the varying magnetic flux. An exemplary differential signal is illustrated at reference numeral 300 in FIG. 5. The comparator circuit 194 then outputs a digital signal 302 which has a transition 306 that corresponds to a predetermined motor position. For example, each time the rotor crosses a motor pole, the differential signal 300 experiences a zero crossing 304. The comparator circuit 194 may then be configured to trip a predetermined period of time after the zero crossing (e.g., about 25 microseconds), for example, to reject noise on the differential signal inputs.

Furthermore, as described in conjunction with FIG. 4a, the strobe control circuit 202 receives the output of the comparator circuit 194 and when a transition 306 is detected, control circuitry therein waits for the next rising edge of the PWM control signal 308 and generates a control signal to activate the transistor 200 for a predetermined time to generate a current event, for example, a current pulse 310, on the control line 150. According to one exemplary aspect of the present invention, the strobe control circuit 202 waits a predetermined period of time ($t_{delay}$) (e.g., about 1 microsecond) after the rising edge of the PWM control signal and activates the transistor for a predetermined period of time $t_{pW}$ (e.g., about 1 microsecond) to ensure that the PWM control signal is high when the transistor 200 is activated, and thus ensure generation of the desired current event.

According to another aspect of the present invention, a method of driving a motor is disclosed in which motor control data and actual motor speed data are convolved together on a single wire, thereby simplifying motor speed feedback systems. The exemplary method is illustrated in the flow chart of FIG. 6, and designated at reference numeral 350. At an initial condition, a motor is being driven at a PWM control signal duty cycle corresponding to a desired speed, wherein a controller circuit is generating the PWM control signal and transmitting it to a motor drive circuit. A predetermined motor position is detected at step 352, for example, by detecting a rotor crossing a motor pole.

When the predetermined motor position has been detected, the PWM control signal is evaluated and a time period is identified at which the PWM control signal will be at a high digital value at step 354. A current pulse or other current event is then generated when the PWM control signal is high at step 356, wherein the current pulse is on the same single wire as the PWM control signal, thereby resulting in a convolution of motor control data and actual motor speed data on the single wire. For example, such a current event may be generated in a manner similar to that described above in conjunction with FIG. 4a, however, any manner of generating such a current event may be employed and is contemplated as falling within the scope of the present invention.

The method 350 then continues at step 358, wherein the current event such as a current pulse on the single wire is detected. For example, such a current event may be detected by passing the PWM control signal through a resistive component. Thus, when a current event occurs, a voltage is detected across the resistive component. Alternatively, however, other current detection methods and circuits may be utilized and such alternatives are contemplated as failing within the scope of the present invention.

Once the current events are detected, the detected current events are used to determine an actual motor speed at step 360. For example, a time period between successive current events corresponds to a rate at which the predetermined position of the motor is detected. Such time periods can be determined and subsequently used to ascertain motor speed using, for example, a timer circuit and a decoder circuit as described above. Alternatively, other methods of achieving step 360 may be employed and are contemplated as falling within the scope of the present invention.

Once the actual motor speed is determined using the current events on the single wire, the motor controller circuitry may use the actual speed information to modify a duty cycle of the PWM control signal in order to alter the motor speed to thus maintain a motor speed target or range as may be desired.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application. Furthermore, to the extent that the term "includes" is used in either the detailed description and the claims, such term is intended to be inclusive in a manner similar to the term "comprising."

What is claimed is:

1. A motor driver system having tachometer feedback, the system having a motor controller circuit operable to generate a pulse width modulation (PWM) control signal, and a motor driver circuit operable to driver a motor at a duty cycle associated with the PWM control signal, comprising:
    a motor position detection circuit operable to generate a signal associated with a predetermined position of a rotor of the motor;
    a current pulse generation circuit operable to generate a current pulse associated with the PWM control signal in response to the signal from the motor position detection circuit; and
    a motor speed determination circuit operable to determine a speed of the motor using the current pulse.

2. The system of claim 1, wherein the motor controller circuit comprises one integrated circuit chip and the motor driver circuit comprises another integrated circuit chip, and wherein the current pulse comprises a current draw on the PWM control signal when the PWM control signal is at a high digital voltage level, wherein the current pulse is convolved with the PWM control signal.

3. The system of claim 2, wherein the current pulse generation circuit comprises a transistor having a terminal coupled to the PWM control signal and a control terminal coupled to the motor position detection circuit, wherein when the signal of the motor position detection circuit transitions, the transistor conducts when the PWM control signal is at the high digital voltage level and draws current for a predetermined amount of time.

4. The system of claim 3, wherein the motor speed determination circuit comprises:
    a timer circuit operable to generate data indicating a period of time between successive current pulses associated with the PWM control signal; and
    a decoder circuit operable to determine a speed of the motor based on the data provided by the timer circuit.

5. The system of claim 4, wherein the timer circuit is operable to collect timing data associated with a plurality of successive current pulses and generate data indicating an average period of time between successive current pulses.

6. The system of claim 3, wherein the decoder circuit is operable to determine the speed of the motor based on the data provided by the timer circuit and also on data associated with a type of motor employed in the system.

7. The system of claim 2, wherein the motor position detection circuit comprises a Hall sensor operable to determine the motor position based on a magnetic flux of the rotor which is a function of a motor position.

8. The system of claim 7, wherein the motor position detection circuit further comprises a comparator circuit operable to receive a differential input signal from the Hall sensor and output a digital signal having a transition frequency which is a function of a zero crossing of the differential input signal.

9. A motor drive system, comprising:
    a motor controller circuit operable to generate a PWM control signal for control of a motor speed, the motor controller circuit comprising:
        a current detection circuit; and
        a motor speed determination circuit;
    a motor driver circuit operable to drive a motor at a duty cycle based on the PWM control signal from the motor controller circuit, the motor driver circuit comprising:
        a current sink circuit operable to draw current from the PWM control signal when the PWM control signal is high and when the motor reaches a predetermined position,
    wherein the current detection circuit is operable to detect the current draw on the PWM control signal and provide an indication signal to the motor speed determination circuit associated with such detection, and
    wherein the motor speed determination circuit is operable to determine the speed of the motor based upon a timing associated with successive current draw detections.

10. The system of claim 9, further comprising a position detection circuit operable to detect the predetermined position of the motor and generate a signal associated therewith.

11. The system of claim 10, wherein the position detection circuit comprises a Hall sensor operable to detect a magnetic flux of a rotor of the motor which varies as a function of rotor position, and further operable to output a differential signal associated therewith.

12. The system of claim 11, wherein the position detection circuit further comprises a comparator circuit coupled to the Hall sensor, wherein the comparator circuit is operable to generate a digital signal which is a function of the differential signal of the Hall sensor.

13. The system of claim 12, wherein the digital signal of the comparator circuit transitions from one digital value to another digital value when the differential signal experiences a zero crossing.

14. The system of claim 9, wherein the current sink circuit comprises:
    a transistor having a terminal coupled to the PWM control signal from the fan controller circuit and a control terminal; and
    a strobe control circuit coupled to the control terminal of the transistor, wherein the strobe control circuit is operable to generate a control signal based on the predetermined position of the motor, and wherein the control signal controls a conduction of the transistor, wherein the conduction of the transistor results in the current draw on the PWM control signal.

15. The system of claim 9; wherein the current detection circuit comprises:
    a resistor on an output portion of the motor controller circuit, wherein a PWM control signal output port is coupled to the resistor; and
    a comparator circuit having two input terminals coupled across the resistor, wherein when the PWM control signal experiences a current draw from the current sink circuit, a voltage develops across the resistor, causing an output of the comparator circuit to transition, thereby generating a current draw indication.

16. The system of claim 9, wherein the motor speed determination circuit comprises:
    a timer circuit operable to generate data indicating a period of time between successive current draws on the PWM control signal; and
    a decoder circuit operable to determine the motor speed using the data from the timer circuit.

17. The system of claim 16, wherein the decoder circuit is further operable to determine the motor speed using data relating to a type of motor being employed in the system.

18. The system of claim 16, wherein the decoder circuit is further operable to determine an average motor speed using data from the timer circuit indicative of a plurality of successive current draws on the PWM control signal.

19. The system of claim 9, wherein the motor controller circuit and the motor driver circuit comprise separate integrated circuit chips, and wherein the PWM control signal and current draw associated therewith are resident on a single communication wire between the two chips.

20. A method of determining a motor speed, comprising:
 (a) driving a motor at a duty cycle dictated by a PWM control signal;
 (b) detecting a predetermined rotor position of the motor;
 (c) generating a current pulse based on the rotor position, wherein the current pulse is convolved with the PWM control signal;
 (d) detecting the current pulse;
 (e) repeating steps (b)–(d); and
 (f) determining the motor speed using successive detected current pulses.

21. The method of claim 20, wherein detecting a predetermined rotor position of the motor comprises:
 monitoring a magnetic flux associated with the rotor, wherein the flux is a function of a position of the rotor;
 detecting a motor pole based on the monitored magnetic flux; and
 generating a signal indicative of the detected motor pole.

22. The method of claim 20, wherein generating the current pulse comprises:
 coupling a transistor to the PWM control signal;
 coupling a control terminal of the transistor to a signal which reflects the detected rotor position, wherein when the predetermined rotor position is detected the transistor is turned on for a predetermined period of time; and
 sinking current associated with the PWM control signal for the predetermined period of time in which the transistor is conducting, thereby generating the current pulse which is convolved with the PWM control signal.

23. The method of claim 20, wherein detecting the current pulse comprises:
 directing the generated current pulse through a resistive component; and
 detecting a voltage across the resistive component, wherein when the detected voltage exceeds a predetermined threshold, a generated current pulse is detected.

24. The method of claim 20, wherein determining the motor speed comprises:
 determining a time period between successive detected current pulses; and
 determining the motor speed based on the time period.

25. The method of claim 24, wherein determining a time period between successive detected current pulses comprises determining a time period between a plurality of successive detected current pulses, and determining the motor speed based on an average time period between the plurality of successive current pulses.

26. The method of claim 24, wherein determining the motor speed further comprises determining the motor speed based on the time period and a type of motor being employed in the system.

* * * * *